Sept. 25, 1934.　　　　　J. W. COOKE　　　　1,974,984
CONTROL SYSTEM
Filed Aug. 19, 1933
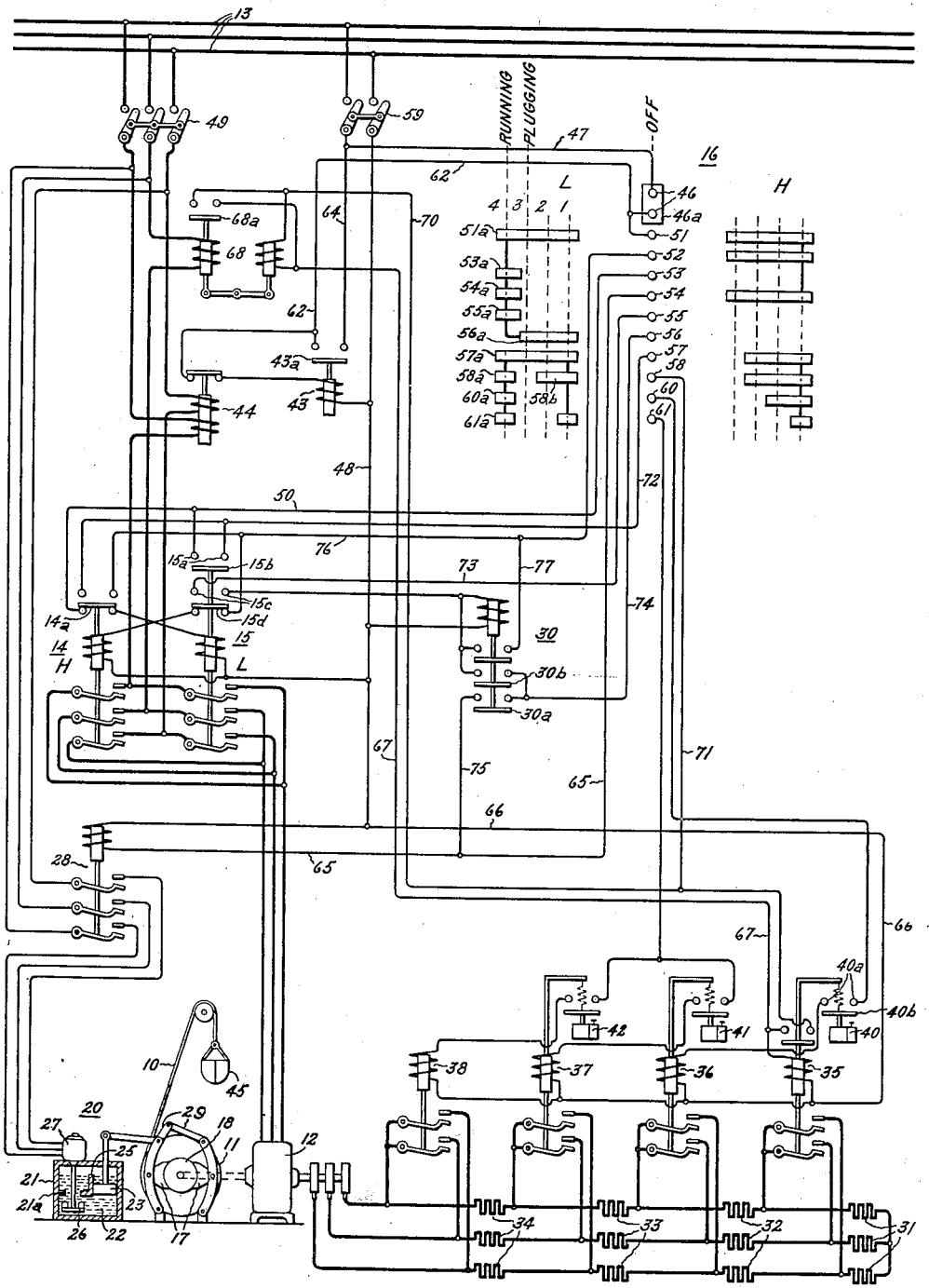
Inventor:
James W. Cooke,
by Harry E. Dunham
His Attorney.

Patented Sept. 25, 1934

1,974,984

UNITED STATES PATENT OFFICE 1,974,984

CONTROL SYSTEM

James W. Cooke, Schenectady, N. Y., assignor to General Electric Company, a corporation of New York Application August 19, 1933, Serial No. 686,951

3 Claims. (Cl. 172—152)

This invention relates to control systems, more particularly to systems for controlling the starting, stopping and reversing operations of electric motors and it has for an object the provision of a simple, reliable and improved system of this character.

In one of its aspects, my invention relates to control systems for bucket hoists and the like. During the lowering operation, it has been customary, in systems of this character, to connect the driving motor to the line for rotation in the lowering direction. As its speed rises above synchronous speed due to the overhauling load, energy is returned to the line and a braking torque is thereby produced. This torque, however, is produced only by operation above synchronous speed and in order to bring the bucket to rest, other braking must be provided. This additional braking is provided by plugging the motor, i. e. disconnecting it from the source and reconnecting it therewith for reverse rotation. The operator accomplishes this operation by returning the master controller from a running position to a plugging position which results in opening the accelerating contactors and the "lowering" primary contactor, and closing the primary "hoisting" contactor. Plugging the motor produces powerful braking torque and quickly retards the motor.

In addition, installations of this character are usually provided with a mechanical brake for maintaining the bucket in any position when the hoisting motor is deenergized. Heretofore, it has been customary to connect the operating solenoid of this mechanical brake to the motor terminals to provide setting the brake upon deenergization of the motor. However, this arrangement also results in setting the brake during the plugging operation in the interval between opening the primary lowering contactor and closing the primary hoisting contactor.

As a result, the equipment is retarded both by the mechanical brake and the plugging torque of the motor, thus causing unnecessary wear on the brake surfaces, gears, drums and other mechanical parts and thus defeating the object of braking the equipment electrically. This has been especially true of installations in which the mechanical brake was maintained released by means of motor operating mechanism connected across the hoist motor terminals and was due to the fact that plugging the driving motor also effected plugging the motor of the brake operating mechanism, thereby producing a still more rapid setting of the mechanical brake which in certain cases has even resulted in rupturing the hoist cables.

In carrying the invention into effect in one form thereof, the hoist is driven by means of an electric motor provided with a mechanical brake together with means for normally causing the brake to set when the motor is deenergized but preventing the setting of the brake during a plugging operation of the hoist driving motor.

In illustrating the invention in one form thereof, it is shown as applied to the motor driving the holding line of a bucket hoist.

For a better and more complete understanding of this invention, reference should now be had to the following specification and to the accompanying drawing the single figure of which is a simple, diagrammatical representation of an embodiment of the invention. Referring now to the drawing the holding line 10 of a bucket hoist is wound upon a winding drum 11 and unwound therefrom, by suitable driving means illustrated as an alternating current motor 12 of the wound rotor induction type. This motor is supplied from any suitable source such for example as that represented by the three supply lines 13 to which the primary terminals of the motor are arranged to be connected for rotation in one direction or the other under the control of suitable reversing means illustrated as a pair of electromagnetic switches 14 and 15 preferably of the contactor type. The contactor 14 in its closed position serves to connect the motor 12 to the line for rotation in the hoisting direction whilst the contactor 15 in the closed position serves to connect the motor to the line for rotation in the lowering direction.

The operation of these contactors is under the control of a suitable manually operated multi-position master controller indicated generally by the reference character 16. This controller has hoisting positions designated by the reference character H and lowering position designated by the reference character L.

As shown, the motor 12 is provided with a mechanical brake illustrated as comprising a pair of shoes 17 and a braking drum 18 mounted on the shaft of the motor 12. When the motor 12 is at rest the shoes 17 are actuated into engagement with the drum 18 by means of a suitable spring (not shown). In order to effect a rapid release of the brake and a gradual setting thereof, a suitable hydraulic operating device, indicated generally at 20, is provided.

This device is illustrated as comprising a tank 21 containing a liquid 22 such as oil, together with a piston 23 arranged in a cylindrical portion defined by the wall 25, and an impeller 26 which is arranged to be rotated by a suitable motor 27 to create a differential fluid pressure across the piston 23. When the impeller is rotated at a sufficiently high speed the differential pressure produced across the piston 23 causes the latter to rise in its cylinder and release the brake shoes 17 to which the piston is connected through a leverage mechanism 29 having a suitable ratio. When the driving motor 27 of the hydraulic operating mechanism is deenergized, its speed effects a correspondingly gradual reduction in fluid pressure across the piston 23 which causes the fluid 22 to escape back along the shaft of the impeller 26 past the partition 21a. This allows the piston to sink gradually and thus produces a gradual setting of the brake shoes 17 against the drum 18. The hydraulic operating mechanism 20 is the invention of Walter O. Lum and is described and claimed in application Serial No. 193,016, filed May 20, 1927 and assigned to the assignee of the present invention. Nothing disclosed in the said Lum application is claimed herein. The driving motor 27 of the hydraulic operating mechanism 20 may be of any suitable type but is herein illustrated as an alternating current type motor supplied from a suitable source such as that represented by the supply line 13 to which the motor terminals are arranged to be connected by any suitable means illustrated as a contactor 28.

Heretofore, it has been customary to connect the terminals of the brake operating mechanism motor 27 directly to the terminals of the driving motor 12 so that the motor 27 would be energized to effect release of the brake when the driving motor 12 was energized and similarly would be deenergized to provide gradual setting of the brake when the driving motor 12 was deenergized. As previously pointed out, such an arrangement would cause the brake operating mechanism motor 27 to be plugged when the motor 12 was plugged which would effect a sudden stopping of the impeller 26 and a sudden application of the brake shoes 17 to the drum 18 which, as pointed out above, is for certain reasons undesirable and even destructive of the apparatus. For this reason, a contactor 28 is provided for connecting the motor 27 with the supply source 13 under certain operating conditions. The contactor 28 is under the control of the master controller 16.

A suitable sequencing control relay 30 cooperates with the reversing mechanism 14, 15 and the controller 16 to effect application of the mechanical brake when the controller 16 is in the off position and the hoisting motor 12 is deenergized but prevents the application of this mechanical brake during a plugging operation of the motor 12 in response to operation of the controller 16 from the running to the plugging position.

The speed of the driving motor 12 is controlled by a plurality of secondary resistance sections, 31, 32, 33 and 34 respectively under the control of accelerating contactors 35, 36, 37 and 38. The accelerating contactors may be provided with time limit control or any other of the well known forms of control for inserting a certain time delay between the successive operations of the contactors, thereby preventing a large current inrush to the motor. In the drawing, the contactors are illustrated as being provided with time limit control in which a time delay between the successive operations of the contactors is provided by means of time delay devices conventionally illustrated as dashpots 40, 41 and 42.

With the above understanding of the elements and apparatus and their organization in the completed system, the operation of the system itself will readily be understood from the following detailed description:

The system is placed in condition for operation by operating the line switch 49 and the control switch 59 to their closed positions. The system is now in the deenergized condition in which it is illustrated. To lower the bucket 45, the master controller is immediately operated from the off position in which it is illustrated to its extreme left hand or running position. There are no hand control positions on the lowering side of the controller 16 and the reason for this is to prevent the motor from being driven at an abnormally high speed such as would be the case with an overhauling load on the motor and resistance connected in its secondary circuit. Prior to the operation of the master controller to the running position a circuit is established for the operating coil of undervoltage relay 43 which circuit is traced from the lower supply line 13 through the switch 59, operating coil of relay 43, contact of the overload relay 44 (in the lower closed position thereof) conductor 62, fingers 46 bridged by segments 46a conductor 47 to the upper supply line 13. Undervoltage relay 43 closes in response to energization and its movable contact member 43a bridges its cooperating stationary contact members to establish a holding circuit for the operating coil of the relay independent of the fingers 46 and segment 46a of the master switch. Operation of the master controller to its fourth or running position in the lowering direction completes an energizing circuit for the operating coil of lowering contactor 15 that is traced from the lower supply line 13 through the switch 59 and the conductor 48 to the coil of contactor 15, thence through interlocks 14a of the hoisting contactor 14 in the lower position thereof, conductor 50 the finger 53 of master controller and cooperating segment 53a to power segments 51a and cooperating finger 51, conductor 62, contact 43a of undervoltage relay and thence by conductor 64 and switch 59 to the upper supply line 13. As a result of the energization of its operating coil the lowering contactor 15 is operated to its upper closed position in which it connects the terminals of the hoist motor 12 to the supply lines 13 through connections that are indicated in heavy lines in the drawing and obviously require no tracing. Simultaneously an energizing circuit is established for the operating coil of the brake contactor 28 which circuit is traced from the lower supply line 13 to the conductor 48 as before, thence through the operating coil of contactor 28, conductor 65, finger 54 and cooperating segments 54a of the master controller, thence by way of segment 53a to the power segment 51a and thence through connections previously traced to the upper supply line 13. The brake contactor 28 closes and connects the motor 27 of the brake operating mechanism 20 to the supply source 13 over connections that obviously require no tracing. Energization of the motor 27 effects release of the brake shoes 17 from the drum 18 in a manner described at a previous point in this specification.

Since the lowering contactor 15 is closed, the hoist motor 12 begins to rotate in the lowering direction. Operation of the lowering contactor 15 to its closed position also effects closure of the first accelerating contactor 35 to exclude resistance section 31 from the secondary circuit of motor 12; the energizing circuit for the operating coil of contactor 35 being traced from the lower supply line 13 to the conductor 48 as before, thence by conductor 66 to and through the operating coil of contactor 35, thence by conductor 67 through contact 68a of the protection device 68 which is closed in response to the flow of current in the motor connection, conductors 70 and 71, cooperating finger 58 and segment 58a and cooperating segment 57a and finger 57, conductor 72, stationary interlock contacts 15a bridged by movable contact member 15b and thence by conductor 50 to the upper supply line 13 as previously traced. As a result of the exclusion of resistance section 31, the speed of the motor 12 is increased and after a time interval determined by the setting of the time delay device 40, the stationary contacts 40a are bridged by the movable contact member 40b to complete an energizing circuit for the operating coil of accelerating contactor 36. The energizing circuit for the operating coil of contactor 36 is readily traced through contacts 40a and 40b to the segment 57a of the master controller and from that point to the upper supply line 13 over the circuit already traced for the operating coil of contactor 35. Contactor 36 in closing excludes the resistance section 32 from the secondary circuit of the motor 12 further increasing the speed of the motor. In a similar manner the accelerating contactors 37 and 38 are closed to exclude resistance sections 33 and 34 with time intervals inserted in the closing operation determined by the settings of time element devices 41 and 42.

As soon as the motor 12 is up to full speed, the bucket 45 drives the motor at about 3% above synchronous speed so that the latter acts as an induction generator and returns power to the line.

The closing operation of the lowering contactor 15 also established an energizing circuit for the operating coil of the control relay 30. This circuit is traced from the lower supply line 13 to the conductor 48, thence through the operating coil of relay 30, stationary interlock contacts 15c bridged by movable contact member 15d in the upper position thereof, conductor 73, finger 55 and cooperating segments 55a to the power segment 51a and thence to the upper supply line 13 as previously traced.

The relay 30 closes in response to the energization of its operating coil and its lower auxiliary contact member 30a completes a holding circuit for the operating coil independent of the interlocking contact of the lowering contactor 15. This holding circuit is readily traced from the upper terminal of the coil of relay 30 through the intermediate stationary contacts bridged by the movable contact member 30b lower interlocking contact bridged by the movable contact member 30a and thence by conductor 65 over a previously traced circuit to the upper supply line 13.

When it is desired to stop the bucket 45 as it approaches the pile, the operator turns the master controller 16 back to the third or plugging position. Since the energizing circuit for the operating coils of secondary contactors 35, 36, 37 and 38 are all established through the segments 58a, 60a and 61a in the fourth position of the master controller, it is clear that operation of the master controller to the third position interrupts the energizing circuit of the accelerating contactors thereby causing them to drop to their lower open position in which the resistance sections 31, 32, 33 and 34 are reinserted in the secondary circuit of the motor. In the third position of the master controller, the energizing circuit for the operating coil of lowering contactor L which was previously traced to the segment 53a on the fourth point of the controller, is interrupted, thereby causing the contactor 15 to descend to its lower position in which the motor 12 is disconnected from the line 13. As the master controller is returned from the running position to the plugging position a holding circuit for the operating coil of the relay 30 is completed by the segment 56a of the master controller which it will be observed overlaps the segment 54a so that the additional holding circuit for the coil of relay 30 is established prior to the interruption of the circuit previously traced through the segment 54a. This new holding circuit is traced from the upper terminal of the operating coil of relay 30 through the intermediate stationary interlock contacts bridged by the movable contact member 30b thence by conductor 74 to the finger 56 and cooperating segment 56a and thence to the power segment 51a and to the upper supply line 13 over a previously traced circuit. It will also be observed that the lower movable contact member 30a in cooperation with the segment 56a of the master controller now completes a holding circuit for the operating coil of the brake contactor 28 which is traced from the lower terminal of the coil of contactor 28 by contactors 65 and 75 through the lower stationary contacts of the relay 30 bridged by the movable contact member 30a and from this point to the upper supply line 13 of the circuit already traced for the operating coil of the contactor 30. As a result, the brake contactor remains closed and the brake operating mechanism motor 27 is maintained energized thereby preventing application of the brake shoes 17 to the braking drum 18 even though the motor 12 at this moment is deenergized and disconnected from the supply source 13.

The opening operation of the lowering contactor 15 completes an energizing circuit for the operating coil of the hoisting contactor 14 and this circuit is traced from the lower supply line 13 through the switch 59 to the conductor 48, thence through the operating coil of the hoisting contactor 14 on the lower stationary interlock contact of the contactor 15 bridged by the movable contact member 15d in the lower position thereof, conductors 76 and 77, upper and intermediate contacts of the relay 30 through the conductor 74 and thence to the upper supply line 13 by a previously traced circuit. The hoisting contactor 14 closes in response to the energization of its operating coil and connects the terminals of the motor 12 to the supply line 13 for operation in the reverse direction. This operation is known as "plugging" the motor and causes the latter to exert a powerful braking torque thereby retarding the speed of the bucket 45 as it approaches the pile.

If it is desired to increase this plugging braking torque, the master controller 16 is operated to its second position lowering in which an energizing circuit is established for the operating coil of the accelerating contactor 35. This circuit is traced from the lower supply line 13 through the coil of the contactor 35 to the finger 58 as previously traced, thence through segments 58b and 57a, finger 57, conductor 72, upper stationary contacts of the hoisting contactor 14 bridged by the movable contact member 14a and thence through conductors 76 and 77 and the contacts of the control relay 30 to the upper supply line 13 by a previously traced circuit. The contactor 35 closes and excludes the resistance section 31 from the secondary circuit of the motor 12 thereby increasing its plugging braking torque.

It is to be noted that although the motor 27 of the brake operating mechanism 20 was maintained deenergized and the brake shoes 17 set against the brake drum 18 when the master controller 16 was moved from its central or off position through the plugging position to the fourth or running position, the motor 27 is maintained energized and the brake shoes 17 retracted from the brake drum 18 when the controller 16 is moved back from the fourth or running position to the plugging position or any of the other positions between the running position and the off position. This prevents the mechanical brake setting when it is desired to retard the equipment by the plugging torque of the motor 12, and thereby eliminates unnecessary wear on the brake shoes and drum and the mechanical parts and also prevents the application of a braking torque to the equipment sufficient to snap the hoist cables.

When the bucket 45 reaches the pile, the equipment is stopped by returning the master controller 16 to the central or off position in which the apparatus and parts of the system are all restored to the deenergized condition in which they are ilustrated in the drawing, and the brake shoes 17 are set against the drum 18 by means of the operating spring.

Although in accordance with the provisions of the patent statutes, the invention is illustrated as embodied in concrete form, it will be understood that the various elements and connections are merely illustrative and that the invention is not limited thereto since alterations and modifiactions will readily suggest themselves to persons skilled in the art without departing from the true spirit of the invention or the scope of the annexed claims.

What I claim as new and desire to secure by Letters Patent of the United States, is:—

1. A motor control system comprising an electric motor, a brake, reversing means for said motor comprising a pair of switches, a multi-position master controlling switch for said reversing switches having an off point, a running point and a plugging point, a contact on said controller for effecting release of said brake when said controller is on said running point, a relay responsive to operation of said controller to said running position for establishing a holding circuit for said brake, and contact means on said controller for controlling said relay to prevent application of said brake when said controller is operated to said plugging point.

2. A motor control system for hoists and the like having an overhauling descending load comprising an electric motor for driving the hoist, a brake, a contactor for controlling said brake, reversing means for said motor comprising a hoisting contactor and a lowering contactor, a multi-position reversing switch for controlling said contactors having an off position, a running position and a plugging position intermediate said off and running positions, contact means on said controller for energizing said lowering contactor and said brake contactor to release said brake only after operation of said controller to said running position, a relay responsive to operation of said lowering contactor for partially establishing a locking circuit for said brake contactor, and contact means on said controller cooperating with said relay for completing said locking circuit to prevent setting said brake upon operation of said controller to said plugging position.

3. A motor control system for hoists and the like subject to overhauling descending load comprising an electric motor for driving the hoist, a brake for said motor, means for controlling the direction of rotation of said motor comprising hoisting and lowering contactors and a reversing drum controller for controlling said contactors, said controller having an off position, a running position and a plurality of plugging positions intermediate said off and running positions, a contact segment on said controller for energizing said lowering contactor and releasing said brake only after operation of said controller from said off to said running position, a relay responsive to operation of said lowering contactor for partially establishing a circuit for maintaining said brake released, an additional contact segment on said controller extending throughout said plugging positions for completing said maintaining circuit to prevent setting said brakes upon operation of said controller from said running position to one of said plugging positions.

JAMES W. COOKE.